(12) United States Patent
Ryu (10) Patent No.: US 9,002,052 B2
(45) Date of Patent: Apr. 7, 2015

(54) METHOD, SERVER, AND COMPUTER-READABLE RECORDING MEDIUM FOR ASSISTING MULTIPLE USERS TO PERFORM COLLECTION SIMULTANEOUSLY

(75) Inventor: Jung Hee Ryu, Seoul (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/388,286

(22) PCT Filed: Dec. 30, 2011

(86) PCT No.: PCT/KR2011/010388
§ 371 (c)(1),
(2), (4) Date: Jan. 31, 2012

(87) PCT Pub. No.: WO2012/121480
PCT Pub. Date: Sep. 13, 2012

(65) Prior Publication Data
US 2013/0202207 A1 Aug. 8, 2013

(30) Foreign Application Priority Data
Mar. 4, 2011 (KR) .......................... 10-2011-0019570

(51) Int. Cl.
*G06K 9/00* (2006.01)
*G06K 9/18* (2006.01)
*G06Q 30/02* (2012.01)

(52) U.S. Cl.
CPC ...... *G06K 9/18* (2013.01); *G06Q 30/02* (2013.01); *G06Q 30/0207* (2013.01)

(58) Field of Classification Search
None
See application file for complete search history.

(56) References Cited

U.S. PATENT DOCUMENTS 5,131,053 A * 7/1992 Bernzott et al. .............. 382/176
5,367,578 A * 11/1994 Golem et al. ................. 382/183
(Continued)

FOREIGN PATENT DOCUMENTS

KR   10-2006-0026924   3/2006
KR    2006-0026924 A   3/2006
(Continued)

OTHER PUBLICATIONS

PCT Search Report, PCT/KR2011/010388, Aug. 27, 2012, 6 pages.
(Continued)

*Primary Examiner* — Jon Chang
*Assistant Examiner* — Oneal R Mistry
(74) *Attorney, Agent, or Firm* — Blakely, Sokoloff, Taylor & Zafman LLP (57) ABSTRACT

The present invention relates to a method for assisting multiple users to perform a collection simultaneously. The method includes the steps of: (a) acquiring digital data created with respect to recognition reference information of an object from a terminal of each of the multiple users; (b) determining or recognizing whether the respective digital data on the recognition reference information acquired through the terminals were created within a preset place condition and whether the respective digital data on the recognition reference information acquired through the terminals were created within a preset scope of the time; (c) selecting a specified group of users, including a first to an n-th user among the multiple users, who create the digital data within the preset place condition and within the preset scope of the time; and (d) providing information on rewards corresponding to the object for users included in the specified group of users.

7 Claims, 5 Drawing Sheets

(56) References Cited

U.S. PATENT DOCUMENTS

| | | | |
|---|---|---|---|
| 6,738,154 B1* | 5/2004 | Venable .................. 358/1.15 |
| 7,088,862 B1* | 8/2006 | Silver et al. .................. 382/199 |
| 7,765,231 B2* | 7/2010 | Rathus et al. .................. 707/783 |
| 7,769,633 B2* | 8/2010 | Jokinen et al. .................. 705/14.4 |
| 7,991,715 B2* | 8/2011 | Schiff et al. .................. 706/20 |
| 8,055,081 B2* | 11/2011 | Luo et al. .................. 382/224 |
| 8,121,346 B2* | 2/2012 | Williams .................. 382/103 |
| 8,144,232 B2* | 3/2012 | Larson et al. .................. 348/333.05 |
| 8,405,740 B2* | 3/2013 | Nichols et al. .................. 348/231.2 |
| 8,406,531 B2* | 3/2013 | Ramanujapuram et al. .. 382/209 |
| 8,532,927 B2* | 9/2013 | Joshi et al. .................. 701/537 |
| 8,538,961 B2* | 9/2013 | Xu et al. .................. 707/736 |
| 2001/0012391 A1* | 8/2001 | Matsuyama et al. .................. 382/145 |
| 2007/0083535 A1* | 4/2007 | Zilliacus et al. .................. 707/101 |
| 2007/0103565 A1* | 5/2007 | Xu et al. .................. 348/231.2 |
| 2007/0159522 A1* | 7/2007 | Neven .................. 348/14.02 |
| 2008/0248815 A1* | 10/2008 | Busch .................. 455/456.5 |
| 2009/0196510 A1* | 8/2009 | Gokturk et al. .................. 382/224 |
| 2009/0257663 A1* | 10/2009 | Luo et al. .................. 382/224 |
| 2009/0285492 A1 | 11/2009 | Ramanujapuram |
| 2011/0034176 A1 | 2/2011 | Lord |
| 2012/0243785 A1* | 9/2012 | Yu et al. .................. 382/173 |

FOREIGN PATENT DOCUMENTS

| | | |
|---|---|---|
| KR | 10-0618726 B1 | 8/2006 |
| KR | 10-2006-0102677 | 9/2006 |
| KR | 10-0618726 | 9/2006 |
| KR | 10-0970121 | 7/2010 |

OTHER PUBLICATIONS

European Search Report, EP 11 86 0625, Jul. 10, 2014, 10 pages.

* cited by examiner

METHOD, SERVER, AND COMPUTER-READABLE RECORDING MEDIUM FOR ASSISTING MULTIPLE USERS TO PERFORM COLLECTION SIMULTANEOUSLY

CROSS REFERENCE TO RELATED APPLICATIONS

The present application is a national phase of International Patent Application No. PCT/KR2011/010388, entitled Method, Server, and Computer-Readable Recording Medium for Assisting Multiple Users to Perform Collection Simultaneously, filed Dec. 30, 2011, which in turn claims priority to Korean Patent Application No. 10-2011-0019570, entitled Method, Server, and Computer-Readable Recording Medium for Assisting Multiple Users to Perform Collection Simultaneous, filed Mar. 4, 2011, the entire contents of which are incorporated herein by reference for all purposes.

FIELD OF THE INVENTION

The present invention relates to a method, a server, and a computer-readable recording medium for assisting multiple users to perform collections simultaneously; and more particularly, to the method, the server, and the computer-readable recording medium for leading the multiple users to collectively perform collections of an object by (i) providing information on a mission, relating to the object, which may be performed by the multiple users and information on rewards to be granted if the mission is completed, (ii) recognizing whether digital data made by the multiple users were created within a preset time condition and additionally recognizing whether the digital data were created within a preset place condition and/or whether the objects included in the digital data correspond to a specific object (i.e., whether the digital data were created within a so-called object condition), (iii) selecting a specified group of users who complete the mission by creating the digital data while satisfying the above-mentioned conditions, and (iv) providing rewards corresponding to the object for the users included in the selected specified group of users.

BACKGROUND OF THE INVENTION

Recently, due to the widespread use of the Internet, it has been common to provide information converted in a digital form which was once offered in a form of printing such as books. As the information converted into digital data may be shared and delivered in real time by many users thanks to the spread of the Internet and a 3G network or other high-speed communications systems, it is widely used compared to printed materials which relatively lack information sharing and information delivery.

In particular, a technology of providing detailed information on an object existing in reality by using an image of the object taken in real time by a user terminal or other recognition information of the object acquired thereby has been recently introduced.

When a variety of services, e.g., services of providing detailed information relating to numerous objects existing in reality as shown above, are provided, it is difficult to effectively store an image taken or other recognition information inputted by the user terminal. Even if a user wants to store only the information on an object with relatively high interest (or high importance) differentially, it is complicated and vexatious to systematically record and store the information. Therefore, it is true that it has certain limits to lead the more active participation of the users.

Accordingly, the applicant came to develop a technology of leading multiple users to more actively participate in a variety of services relating to objects in the real world by applying a concept of social network service (SNS) at issue in the field of information and technology.

SUMMARY OF THE INVENTION

It is an object of the present invention to solve all the problems mentioned above.

It is another object of the present invention to encourage collective desire for the participation of users by (i) providing information on a mission, in relation to an object, which may be simultaneously performed by multiple users and information on rewards which can be offered if the mission is completely performed and (ii) granting the rewards corresponding to the object to selected users who have actually completed the mission.

It is still another object of the present invention to activate a social network service (SNS) by leading a group of users to create digital data through a same act simultaneously in use of mob psychology of the users.

In accordance with one aspect of the present invention, there is provided a method for assisting multiple users to perform a collection simultaneously, including the steps of: (a) acquiring digital data created with respect to recognition reference information of an object, including at least one piece of a taken image of the object, a near field communication (NFC) tag of the object and information itself indicating that the object was selected, from a terminal of each of the multiple users; (b) determining or recognizing whether the respective digital data on the recognition reference information acquired through the terminals were created within a preset place condition by referring to information acquired by location recognition modules of the respective terminals and whether the respective digital data on the recognition reference information acquired through the terminals were created within a preset scope of the time by referring to information acquired by time recognition modules thereof; (c) selecting a specified group of users, including a first to an n-th user among the multiple users, who create the digital data within the preset place condition and within the preset scope of the time; and (d) providing information on rewards corresponding to the object for users included in the specified group of users.

In accordance with another aspect of the present invention, there is provided a method for assisting multiple users to perform a collection simultaneously, including the steps of: (a) recognizing identities of objects by using at least one of (i) an object recognition technology for recognizing the identities of the objects by matching images of the objects, if inputted on respective screens of terminals, with a pre-stored reference object image to compute degrees of similarity and by using an identifier of the reference object image whose degree of similarity exceeds a prefixed degree of similarity threshold, (ii) an optical character recognition (OCR) technology for identifying the objects by recognizing at least one of character, number or symbol included in the objects and (iii) a barcode recognition technology for recognizing the identities of the objects from barcodes included therein; (b) acquiring each of digital data respectively having at least some of information on an image of the recognized object and information on an auto comment containing a phrase or a sentence properly assembled under the grammar of a language by using at least one piece of recognition information on the identity of the object and recognition information on the place where, and the time when, the inputted image was created; (c) determining or recognizing whether the respective digital data of the object were created within a prefixed scope of the time by referring to information acquired by time recognition modules of the respective terminals and whether the object corresponds to a prefixed specific object by referring to information acquired by the object recognition modules thereof if requests for the multiple users to register the digital data are received from their respective terminals; (d) selecting a specified group of users, including a first to an n-th user among the multiple users, who create the digital data within the preset scope of the time and make the objects included in the created digital data correspond to the specific object; and (e) providing information on rewards corresponding to the specific object for users included in the specified group of users.

In accordance with still another aspect of the present invention, there is provided a method for assisting multiple users to perform a collection simultaneously, including the steps of: (a) acquiring, from a terminal of each of the multiple users, digital data, formed by at least some of images of objects, information on near field communication (NFC) tags and information itself indicating that the objects were selected, created by the respective terminals of the multiple users; (b) determining or recognizing whether the respective digital data were created within a preset place condition by referring to information on current locations provided by location recognition modules of the respective terminals and whether the respective digital data were created within a preset scope of the time by referring to information acquired by time recognition modules thereof; (c) selecting a specified group of users, including a first to an n-th user among the multiple users, who create the digital data within the preset place condition and within the preset scope of the time; and (d) providing information on rewards for users included in the specified group of users.

In accordance with still another aspect of the present invention, there is provided a server for assisting multiple users to perform a collection simultaneously, including: a digital data acquiring part for acquiring digital data created with respect to recognition reference information of an object, including at least one piece of taken image of the object, a near field communication (NFC) tag of the object and information itself indicating that the object was selected, from a terminal of each of the multiple users; a condition determining part for determining or recognizing whether the respective digital data on the recognition reference information acquired through the terminals were created within a preset place condition by referring to location recognition modules of the respective terminals and whether the respective digital data on the recognition reference information acquired through the terminals were created within a preset scope of the time by referring to information acquired by time recognition modules thereof; a user selecting part for selecting a specified group of users, including a first to an n-th users among the multiple users, who create the digital data within the preset place condition and within the preset scope of the time; and a reward information managing part for providing information on rewards corresponding to the object for users included in the specified group of users.

In accordance with still another aspect of the present invention, there is provided a server for assisting multiple users to perform a collection simultaneously, including: a digital data acquiring part for recognizing identities of objects by using at least one of (i) an object recognition technology for recognizing the identities of the objects by matching images of the objects, if inputted on respective screens of terminals, with a pre-stored reference object image to compute degrees of similarity and by using an identifier of the reference object image whose degree of similarity exceeds a prefixed degree of similarity threshold, (ii) an optical character recognition (OCR) technology for identifying the objects by recognizing at least one of characters, numbers or symbols included in the objects and (iii) a barcode recognition technology for recognizing the identities of the objects from barcodes included therein and acquiring each of digital data respectively having at least some of information on an image of the recognized object and information on an auto comment containing a phrase or a sentence properly assembled under the grammar of a language by using at least one piece of recognition information on the identity of the object and recognition information on the place where, and the time when, the inputted image was created; a condition determining part for determining or recognizing whether the respective digital data of the object were created within a prefixed scope of the time by referring to information acquired by time recognition modules of the respective terminals and whether the object corresponds to the prefixed specific object by referring to information acquired by the object recognition modules thereof if requests for the multiple users to register the digital data are received from their respective terminals; a user selecting part for selecting a specified group of users, including a first to an n-th users among the multiple users, who create the digital data within the preset scope of the time and make the objects included in the created digital data correspond to the specific object; and a reward information managing part for providing information on rewards corresponding to the specific object for users included in the specified group of users.

In accordance with still another aspect of the present invention, there is provided a server for assisting multiple users to perform a collection simultaneously, including: a digital data acquiring part for acquiring, from a terminal of each of the multiple users, each of digital data formed by at least some of an image, information on a near field communication (NFC) tag, and information itself indicating that the object was selected, created by respective terminals of the multiple users; a condition determining part for determining or recognizing whether the respective digital data were created within a preset place condition by referring to information on current locations provided by location recognition modules of the respective terminals and whether the respective digital data were created within a preset scope of the time by referring to information acquired by time recognition modules thereof; a user selecting part for selecting a specified group of users, including a first to an n-th users among the multiple users, who create the digital data within the preset place condition and within the preset scope of the time; and a reward information managing part for providing information on rewards for users included in the specified group of users.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The configurations of the present invention for accomplishing the objects of the present invention are as follows:

Herein, a "collection" means an action of a user to digitally collect an object in which a user is interested; and more specifically, it may be defined as a series of processes for acquiring recognition reference information on the object (e.g., a taken image, a near field communication tag, information showing that the object has been selected, etc.) which the user intends to collect by using the user's terminal and transmitting the acquired recognition reference information to a server which performs other subsequent functions (e.g., a function of recognizing an object, creating and storing a collection page, determining a condition or the like). For example, a process for taking a cover of a book by using his or her terminal and transmitting the taken image to the server to thereby allow information on the book to be collected may correspond to the "collection" for the book. Further, an act of the user going to an Italian restaurant named "Alio" and selecting "Alio" by using the terminal itself may be the "collection" for "Alio".

Furthermore, the "collection" may indicate not only a process for transmitting the acquired recognition reference information to the server by using the user terminal but also a process for recognizing the object from the recognition reference information and a process for creating, and storing, a page (so-called a collection page) by combining digital data such as information on an identity of the recognized object (including a type, a characteristic, etc., of the object), information on a place where, and a time when, the recognition reference information on the object was acquired, information on a comment regarding the object, an image corresponding to the object, or the like.

Configuration of the Whole System

Figure 1:
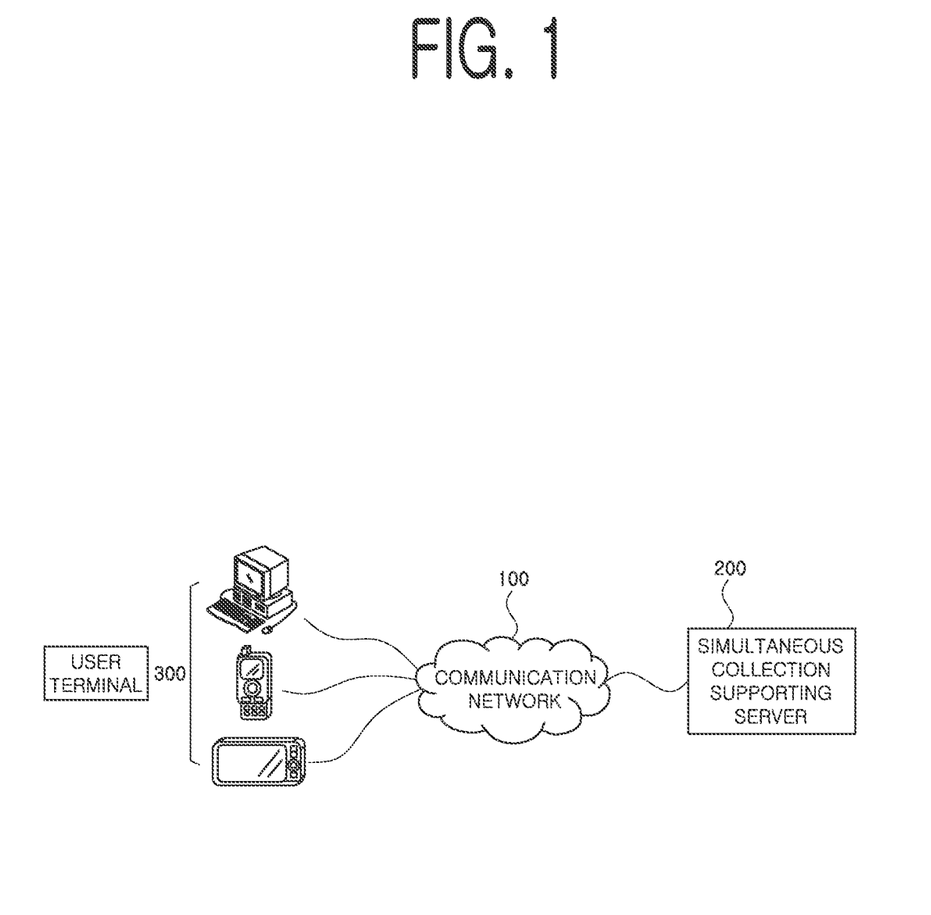
FIG. 1 is a diagram exemplarily representing a configuration of a whole server to assist multiple users to perform collections simultaneously in accordance with one example embodiment of the present invention.

FIG. 1 exemplarily represents a configuration of the whole system to assist multiple users to perform collections simultaneously in accordance with one example embodiment of the present invention.

As illustrated in FIG. 1, the whole system in accordance with one example embodiment of the present invention may include a communication network 100, a user terminal 200, and a simultaneous collection supporting server 300.

First, the communication network 100 in accordance with one example embodiment of the present invention may be configured to be wired or wireless and may be configured in a form of a mobile telecommunication network, a local area network (LAN), a metropolitan area network (MAN), a wide area network (WAN), an artificial satellite network, and other diverse networks. More particularly, the network 100 in the present invention should be understood as a concept inclusive of all network services such as publicly known World Wide Web (www), Code Division Multiple Access (CDMA), Wideband Code Division Multiple Access (WCDMA), Global System for Mobile communications (GSM) and the like.

Next, each user terminal 200 in accordance with an example embodiment of the present invention may perform a function of enabling each user to select an object of his or her interest and create digital data with respect to the object through a camera module, etc., thereof and transmitting the digital data to the simultaneous collection supporting server 300. Specifically, the user terminal 200 may transmit the digital data, such as a simply taken photo, to the simultaneous collection supporting server 300 or recognize the identity of the object included in the digital data such as the photo and recognize the place where, and the time when, the digital data were created, and transmit, to the simultaneous collection supporting server 300, the recognition information on the identity of the object and the place where, and the time when, the digital data were created included in the digital data.

In accordance with another example embodiment of the present invention, the user terminal 200 may display information on objects selectable around a current location by referring to the information on the current location provided by a location recognition module and if a request of a user for a specific object is received, it may create, and transmit to the simultaneous collection supporting server 300, the digital data indicating that the object was selected.

In addition, the user terminal 200 in accordance with an example embodiment of the present invention may perform a function of receiving, from the simultaneous collection supporting server 300, information on a mission, relating to an object, which may be performed, and information on rewards which may be provided if the mission is completely performed.

In accordance with one example embodiment of the present invention, the user terminal 200 is a digital device which includes a function of accessing the communication network 100 or the simultaneous collection supporting server 300 and communicating with it. Such digital devices, including a personal computer (e.g., desktop, laptop, etc.), a workstation, a PDA, a web pad, a cellular phone, which have memory means and micro processors with a calculation ability, may be adopted as the user terminal 200 in accordance with the present invention.

The detailed explanation on an internal configuration and components of the user terminal 200 will be made later.

In addition, the simultaneous collection supporting server 300 in accordance with an example embodiment of the present invention may perform a function of providing the information on the mission with respect to the object which may be performed simultaneously by multiple users and the information on the rewards which may be provided if the mission is completely performed.

Furthermore, the simultaneous collection supporting server 300 in accordance with an example embodiment of the present invention may perform a function of recognizing whether respective digital data made by multiple users were created within a preset time condition, i.e., within a preset scope of the time, whether the respective digital data were created within a preset place condition, i.e., within a preset scope of the place, and/or whether the objects included in the digital data correspond to a specific object, i.e., whether the digital data were created within a so-called object condition.

In accordance with one example embodiment of the present invention, the simultaneous collection supporting server 300 may select a specified group of users who have completely performed the mission by creating the digital data while satisfying various conditions as shown above and providing the information on the rewards corresponding to the object for the users in the selected specified user group. Herein, the relationship among members of the specified user group may be a friend relationship included in the same group by applications, etc., for belonging to the same group from the beginning, or a stranger relationship.

The detailed explanation on an internal configuration and components of the simultaneous collection supporting server 300 will be made later.

Configuration of the User Terminal

Figure 2:
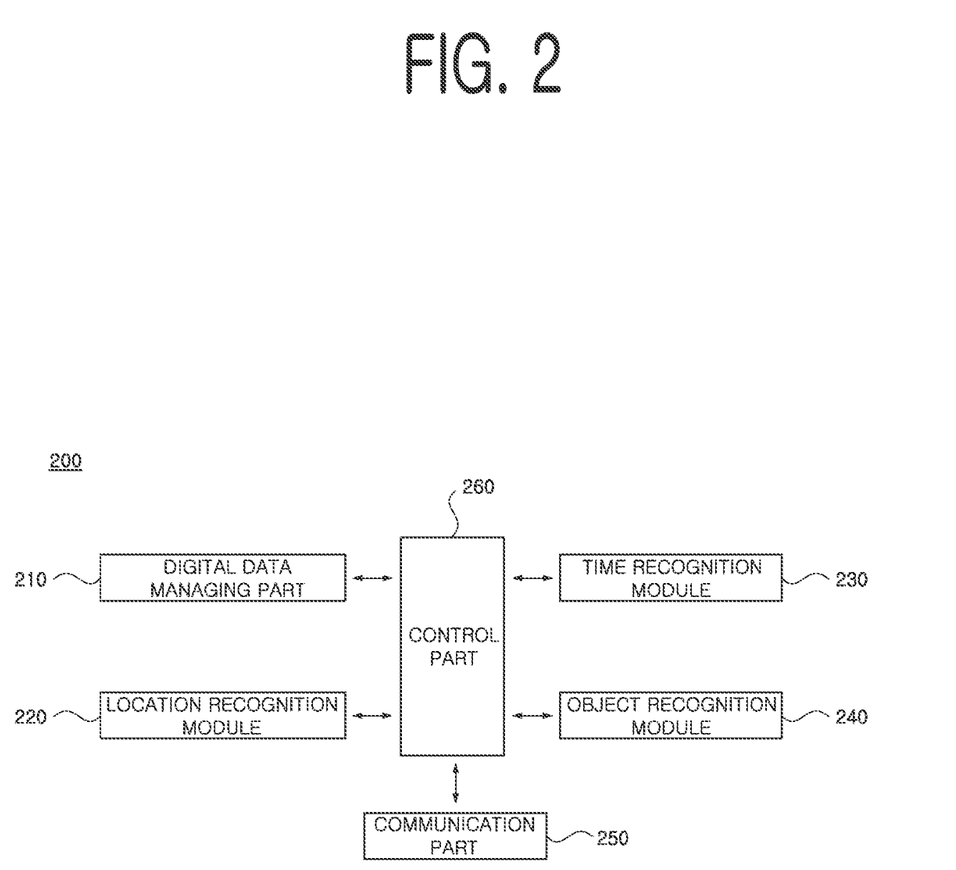
FIG. 2 is a drawing exemplarily illustrating an internal configuration of a user terminal 200 in accordance with one example embodiment of the present invention.

FIG. 2 exemplarily illustrates an internal configuration of the user terminal 200 in accordance with one example embodiment of the present invention.

By referring to FIG. 2, the user terminal 200 may include a digital data managing part 210, a location recognition module 220, a time recognition module 230, an object recognition module 240, a communication part 250, and a control part 260.

In accordance with one example embodiment of the present invention, at least some of the digital data managing part 210, the location recognition module 220, the time recognition module 230, the object recognition module 240, the communication part 250, and the control part 260 may be program modules included in or, communicating with, the user terminal 200. FIG. 2 exemplifies that the digital data managing part 210, the location recognition module 220, the time recognition module 230, the object recognition module 240, the communication part 250, and the control part 260 are all included in the user terminal 200. Such program modules may be included in the user terminal 200 in a form of an operating system, an application program module, and other program modules. In addition, they may be stored either in various storage devices well known to those skilled in the art or in a remote storage device capable of communicating with the simultaneous collection supporting server 300. The program modules may include but not be subject to a routine, a subroutine, a program, an object, a component, and a data structure for executing a specific operation or a type of specific abstract data that will be described in accordance with the present invention.

First of all, the digital data managing part 210 in accordance with one example embodiment of the present invention may perform a function of allowing digital data of the object to be created based on an inputted image at the user's request and to be transmitted to the simultaneous collection supporting server 300 with at least recognition information on a place where the digital data were created and a time when the digital data were created or at least recognition information on the identity of the object included in the digital data and a time when the digital data were created by using the location recognition module 220, the time recognition module 230, and the object recognition module 240, which will be explained later. More specifically, the digital data managing part 210 in accordance with one example embodiment of the present invention may include a photographing apparatus such as a CCD camera to acquire the inputted image including the object.

Furthermore, the digital data managing part 210 in accordance with one example embodiment of the present invention may perform a function of displaying information on objects selectable around the current location by referring to the information on the current location acquired by the location recognition module 220 which will be explained later and, if the request of the user for a specific object is received, perform a function of allowing digital data indicating the specific object was selected to be created. At the time, the digital data may be created to include even information on the time when the object was selected.

Next, if digital data of the object included in the inputted image are created by the digital data managing part 210, the location recognition module 220 in accordance with one example embodiment of the present invention may carry out a function of calculating and recording the current location of the user terminal 200, by using a technology for acquiring location information including GPS technology, A-GPS technology, WPS technology and/or cell-based location based service (LBS), in order to recognize the place where the digital data were created. In addition, the location recognition module 220 in accordance with one example embodiment of the present invention may perform a function of calculating, and transmitting to the digital data managing part 210, the current location of the user terminal 200 to enable the user to create digital data indicating that the object around the current location was selected. Therefore, the location recognition module 220 may include a GPS module, a mobile telecommunication module, etc.

If the digital data of the object are created, the time recognition module 230 in accordance with one example embodiment of the present invention may conduct a function of recognizing and recording the time when the digital data are created.

If the digital data of the specific object are created, the object recognition module 240 in accordance with one example embodiment of the present invention may perform a function of recognizing the identity of the object by using an object recognition technology, an optical character recognition (OCR) technology, a barcode recognition technology, etc.

Herein, as an object recognition technology used to recognize a specific object included in the digital data from different angles and at different distances, the article titled "A Comparison of Affine Region Detectors" authored jointly by K. MIKOLAJCZYK and seven other authors and published in "International Journal of Computer Vision" in November 2005 is hereby incorporated by reference for all purposes. The article describes a method for detecting affine invariant regions to accurately recognize the same object photographed from different angles. Surely, the object recognition technologies applicable to the present invention are not limited only to the method mentioned in the article and it will be able to reproduce the present invention by applying various examples. To use the object recognition technology for recognizing the identity of the object by computing degrees of similarity through image matching, the object recognition module 240 may be interlocked with certain databases (not illustrated) where the reference object images and the corresponding identifiers are recorded.

Moreover, the certain OCR technology for recognizing certain character strings included in the inputted image may refer to the specification of Korea Patent Application No. 2006-0078850, which is hereby incorporated by reference for all purposes. The specification discloses a method for creating each candidate character forming a character string included in the inputted image and applying character recognition technology to each created candidate character. The OCR technology which is applicable to the present invention is not limited to the method described in the specification but various examples may be applied.

In addition, the technology for recognizing a barcode included in the digital data may refer to the specification of Korea Patent Registration No. 0791704, which is hereby incorporated by reference for all purposes. The specification describes a method for extracting a barcode field by analyzing the adjacency relationship of connection fields on the basis of the characteristics of the barcode, determining a unit width which is to be used as a module width of the barcode by referring to a width of the connection field of black pixels in the extracted barcode field and collating a barcode pattern with an input width pattern to thereby recognize the barcode. The OCR technology which is applicable to the present invention is not limited to the method described in the specification but various examples may be assumed.

In addition, the technology for recognizing a QR code of the object included in the digital data may refer to the specification of Korea Patent Registration No. 0852656, which is hereby incorporated by reference for all purposes. The specification describes a method for recognizing a QR code by (i) recognizing location detecting patterns of respective two-dimensional codes from the inputted image, (ii) selecting at least two location detecting patterns and determining whether the minimal units of the location detection patterns are the same or not and (ii) performing a calculation specifying the locations of the two-dimensional codes by using the location detection patterns if the minimal units are the same. Herein, the QR code recognition technology applicable to the present invention is not limited to the method described in the specification but various examples may be assumed.

In accordance with one example embodiment of the present invention, the digital data managing part 210 was explained above with an example of transmitting, to the simultaneous collection supporting server 300, the created digital data with at least some of the recognition information on the place where the digital data were created, recognition information on the time when the digital data were created, and recognition information on the identity of the object, acquired respectively by the location recognition module 220, the time recognition module 230, and the object recognition module 240, but the present invention is not limited only to this case. For example, the digital data managing part 210 in accordance with one example embodiment of the present invention may allow the digital data to be created in a form of a collection page which includes information on an auto comment containing a phrase or a sentence properly assembled under the grammar of a language by using the recognition information on the identity of the object and the recognition information on the place where, and the time when, the digital data were created and image information on the recognized object. More specifically, the explanation on the digital data created in the form of collection page may be made as shown below by referring to FIGS. 3A and 3B.

Figure 3A:
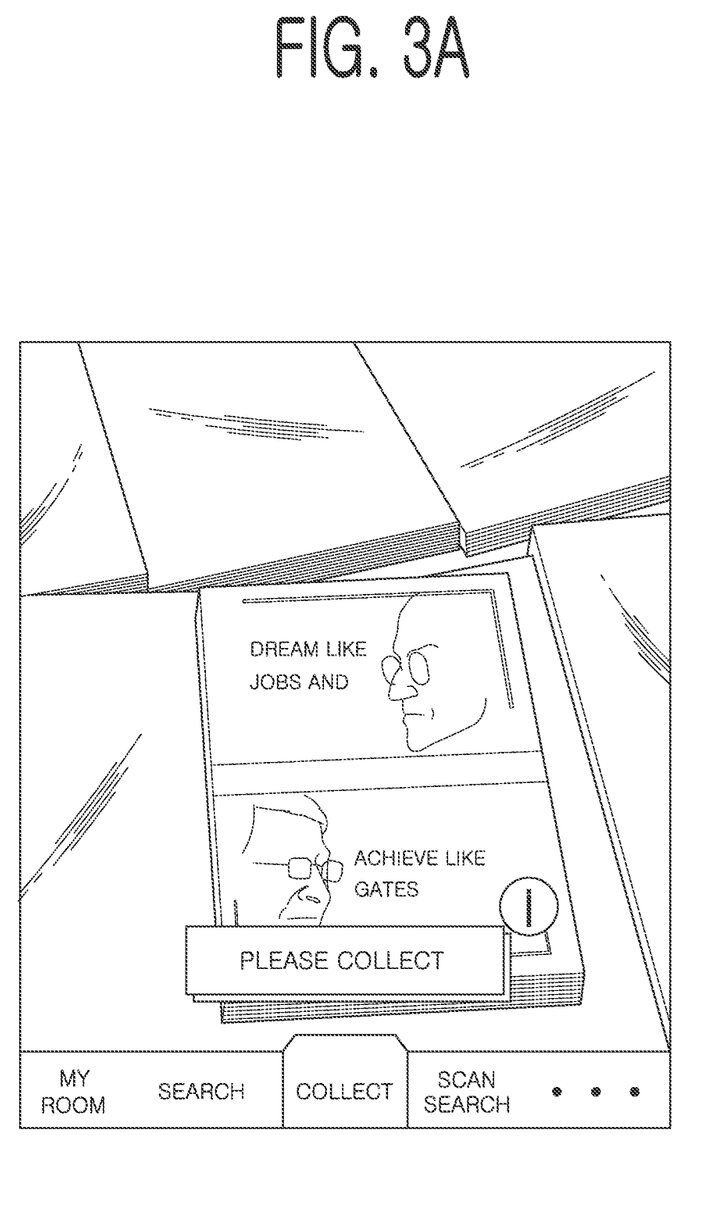
FIGS. 3A and 3B are diagrams exemplarily showing digital data in a form of collection page including information on an auto comment and information on an image of a recognized object in accordance with one example embodiment of the present invention.
Figure 3B:
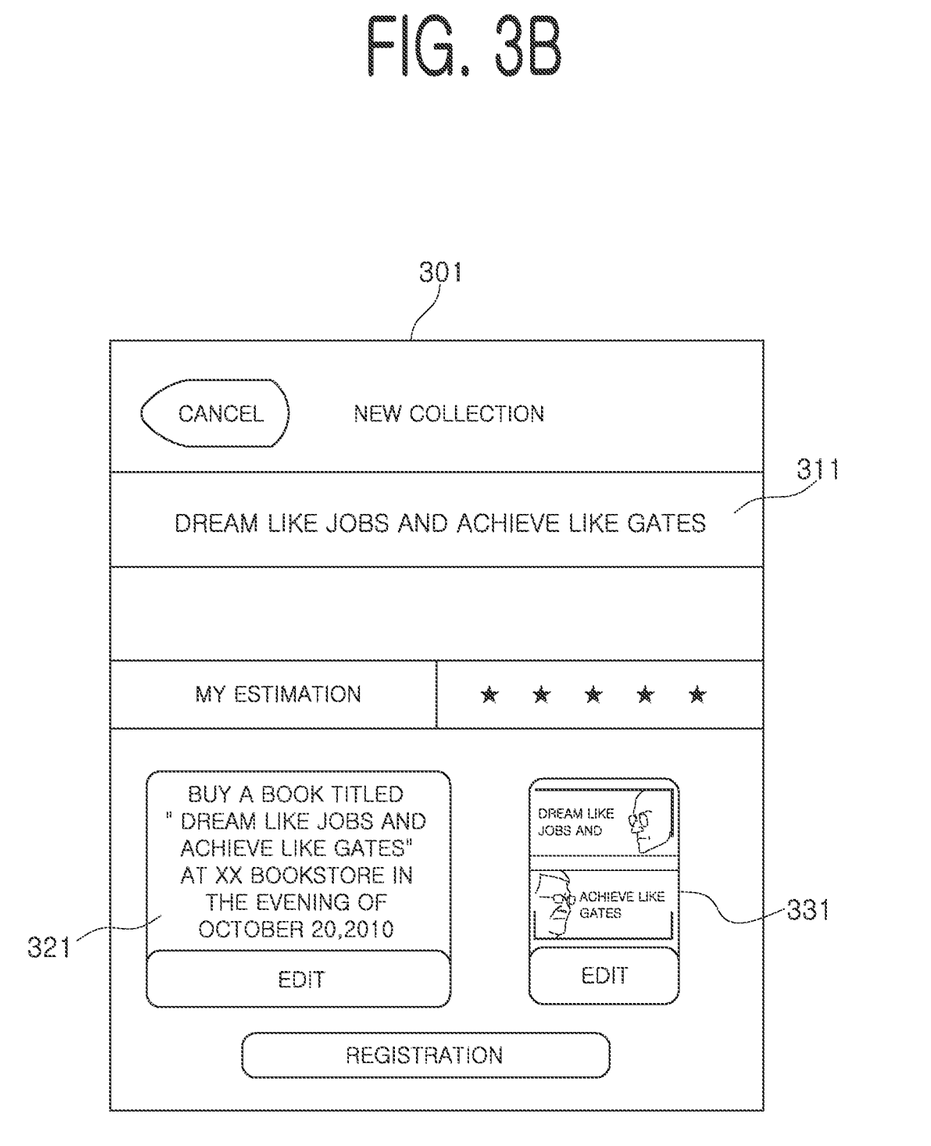

FIGS. 3A and 3B exemplarily illustrate the digital data in the form of collection page including the information on the auto comment and the information on the image of the recognized object in accordance with one example embodiment of the present invention.

By referring to FIG. 3A, when a book titled "Dream Like Jobs and Achieve Like Gates" is included in an image inputted into the user terminal 200, the object recognition module 240 will be able to recognize the object included in the inputted image as the book "Dream Like Jobs and Achieve Like Gates" by applying the object recognition technology, the OCR technology, and/or the barcode recognition technology to the inputted image.

By referring to FIG. 3B, it can be found that the digital data managing part 210 allows digital data to be automatically created in a form of collection page 301 including the thumbnail image 331 of the recognized book and the auto comment 321 properly assembled under English grammar by using at least some of the information on the identity of the book 311 obtained by the object recognition module 240, the information on the place where the inputted image was created (i.e., "XX Bookstore") acquired by the location recognition module 220, and the information on the time when the inputted image was created (i.e., "Oct. 20, 2010") acquired by the time recognition module 230.

In accordance with an example embodiment of the present invention, the communication part 250 may perform a function of allowing the user terminal 200 to communicate with an external device.

Lastly, in accordance with an example embodiment of the present invention, the control part 260 performs a function of controlling the flow of the data among the digital data managing part 210, the location recognition module 220, the time recognition module 230, the object recognition module 240, and the communication part 250. In other words, the control part 260 may control the flow of data from outside or among the components of the user terminal 200 to allow the digital data managing part 210, the location recognition module 220, the time recognition module 230, the object recognition module 240, and the communication part 250 to perform their unique functions.

Configuration of the Simultaneous Collection Supporting Server

Figure 4:
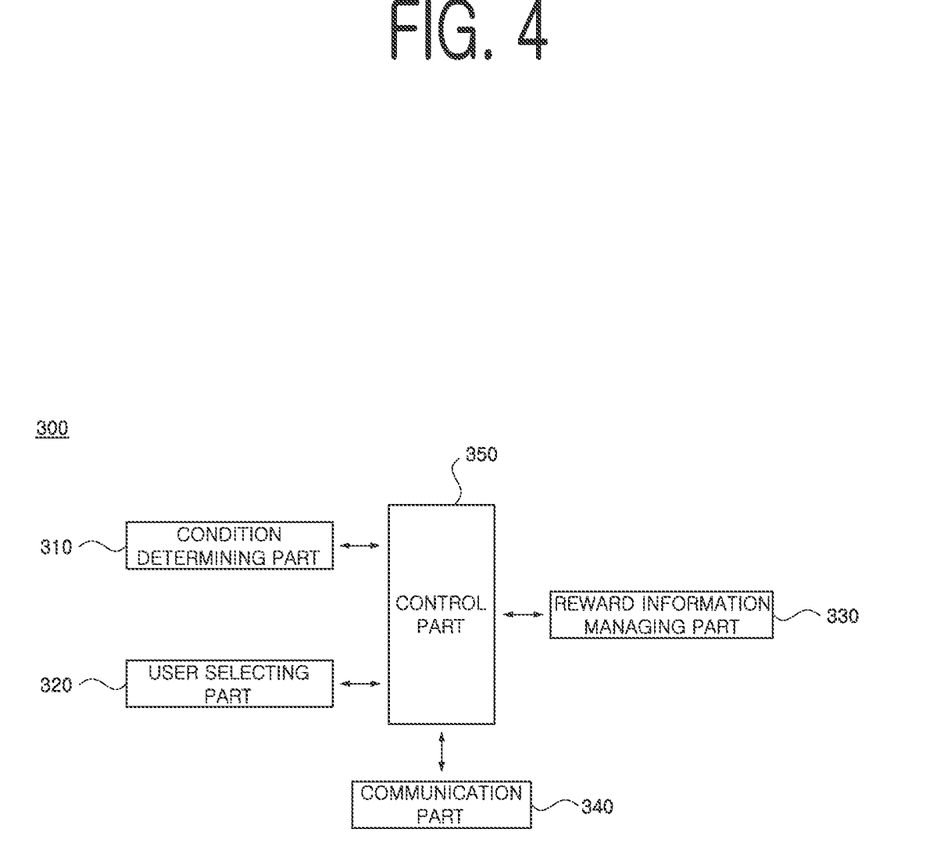
FIG. 4 is a drawing exemplarily representing an internal configuration of a simultaneous collection supporting server 300 in accordance with one example embodiment of the present invention.

FIG. 4 exemplarily illustrates an internal configuration of the simultaneous collection supporting server 300 in accordance with one example embodiment of the present invention.

By referring to FIG. 4, the simultaneous collection supporting server 300 may include a condition determining part 310, a user selecting part 320, a reward information managing part 330, a communication part 340, and a control part 350.

In accordance with an example embodiment of the present invention, at least some of the condition determining part 310, the user selecting part 320, the reward information managing part 330, the communication part 340, and the control part 350 may be included in the simultaneous collection supporting server 300 or may be program modules communicable with the simultaneous collection supporting server 300. FIG. 4 illustrates an example of the simultaneous collection supporting server 300, including the condition determining part 310, the user selecting part 320, the reward information managing part 330, the communication part 340, and the control part 350. Such program modules may be included in the simultaneous collection supporting server 300 in a form of an operating system, an application program module and other program modules, or they may be stored either in various storage devices well known to those skilled in the art or in a remote storage device capable of communicating with the simultaneous collection supporting server 300. The program modules may include but not be subject to a routine, a sub-routine, a program, an object, a component, and a data structure for executing a specific operation or a type of specific abstract data that will be described in accordance with the present invention In accordance with an example embodiment of the present invention, the condition determining part 310 may perform a function of recognizing whether respective digital data of an object(s) generated by multiple users through their terminals 200 were created within the preset place condition and the preset scope of the time by referring to information acquired by the location recognition module 220 and the time recognition module 230 of respective user terminals 200. For example, if mission information such as "Please get a collection by dropping by Dunkin' Donuts Gangman Store at 7:00 p.m. on Jan. 21, 2011" is provided for multiple users by the reward information managing part 330 to be explained later, the condition determining part 310 may check whether the digital data generated through the respective user terminals 200 by the multiple users were created while satisfying the time condition (i.e., 7:00 p.m. on Jan. 21, 2011) and the place condition (i.e., Dunkin' Donuts Gangnam Store) of the mission.

In accordance with one example embodiment of the present invention, the user selecting part 320 may perform a function of judging a specified group of users, including a first to an n-th user among multiple users, who created digital data within the preset place condition and the preset scope of the time.

Explained above was the process for the condition determining part 310 and the user selecting part 320 determining or recognizing whether respective digital data created by respective users satisfy the preset place condition and the preset scope of the time and judging a group of users who satisfy the above-mentioned two conditions, but the condition determining part 310 and the user selecting part 320 in accordance with one example embodiment of the present invention may additionally determine or recognize whether the objects included in the digital data correspond to a specific object or not by using the object recognition modules 240 of respective user terminals 200 if another mission is provided by the reward information managing part 330 to be explained later and judge users who satisfy all the above-mentioned three conditions.

More specifically, if mission information such as "Please collect a chocolate donut at Dunkin' Donuts Gangman Store at 7:00 p.m. on Jan. 21, 2011" is provided for multiple users, the condition determining part 310 may check whether respective digital data generated through respective user terminals 200 by multiple users were created with respect to the specific object (i.e., the chocolate donut) while satisfying the time condition (i.e., at 7:00 p.m. on Jan. 21, 2011) and the place condition (i.e., Dunkin' Donuts Gangnam Store) and the user selecting part 320 may judge a specified group of users who create the digital data while satisfying all the conditions.

Similarly, the condition determining part 310 and the user selecting part 320 in accordance with one example embodiment of the present invention may determine or recognize whether the digital data were created with respect to the specific object within the preset scope of the time and judge users who satisfy the condition by depending on the characteristic of the mission information provided by the reward information managing part 330 to be explained later. For example, if mission information such as "Please collect BMW's newly launched car model at 7:00 p.m. on Jan. 21, 2011" is provided for multiple users, the condition determining part 310 may check whether respective digital data made through user terminals 200 by multiple users were created with respect to the specific object (i.e., BMW's newly launched car model) while satisfying the time condition (i.e., at 7:00 p.m. on Jan. 21, 2011) and the user selecting part 320 may judge the specified group of users who created the digital data while satisfying the aforementioned conditions.

As such, if it is necessary to determine or recognize whether the objects included in the digital data correspond to the specific object or not by depending on the nature of the mission information, the condition determining part 310 in accordance with one example embodiment of the present invention may compute degrees of similarity through matching an image of an object included in the digital data with pre-stored images of a specific object and if the computed degrees of similarity exceed the prefixed degree of similarity threshold, it may determine or recognize that the object included in the digital data corresponds to the specific object.

In accordance with one example embodiment of the present invention, the reward information managing part 330 may provide the mission information, in relation to the object, which may be performed by the multiple users and the information on the rewards provided if the mission is completely performed and granting the rewards corresponding to the object to users in a specified user group if the users in the specified user group are determined to have completely performed the mission. More specifically, the mission information provided by the reward information managing part 330 may be in a form of information requested to create the digital data of the specific object at the same place simultaneously by two or more users, as exemplarily explained above, and the reward information provided by the reward information managing part 330 may include the coupon information issued by a company which is relevant to the specific object.

Next, the communication part 340 in accordance with one example embodiment of the present invention may perform a function of allowing the simultaneous collection supporting server 300 to be communicable with an external device.

Lastly, the control part 350 in accordance with one example embodiment of the present invention may perform a function of controlling the flow of data among the condition determining part 310, the user selecting part 320, the reward information managing part 330, and the communication part 340. In short, the control part 350 may control the flow of data from outside or among the components of the simultaneous collection supporting server 300 to allow the condition determining part 310, the user selecting part 320, the reward information managing part 330, and the communication part 340 to perform their unique functions.

In accordance with the present invention, the reward corresponding to the object is paid for each user in the specified group who completely performs the mission. Therefore, the number of users who will be interested in the aforementioned service may be explosively increased by leading the users to collectively perform the collection for the object.

The embodiments of the present invention can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter, etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variation equal or equivalent to the patent claims pertain to the category of the thought of the present invention.

What is claimed is:

1. A method for assisting multiple users to perform a collection simultaneously, comprising the steps of:
    providing mission information to multiple users requesting creation of digital data relating to a specific object during a preset scope of time at a preset location;
    recognizing the identity of the object within the digital data by matching images of the object with a pre-stored reference object image to compute degrees of similarity and by determining whether those degrees of similarity exceed a prefixed degree of similarity threshold;
    acquiring, from terminals associated with each of the multiple users, digital data having information on an image and an auto comment containing a phrase or a sentence properly assembled under grammar of a spoken language, wherein the phrase or sentence includes recognition information on the identity of the objects and recognition information on a place where, and a time when, the image was created;
    determining whether the digital data was created within the preset scope of time by referring to information acquired by each terminal used to acquire the digital data and whether an object corresponds to the specific object by referring to information acquired if a user of the terminal that acquired the digital data requests to register the digital data;
    selecting a specified group of users that acquired the digital data within the preset scope of time, wherein the digital data acquired by the specified group of users indicates that the object associated with the acquired digital data corresponds to the specific object; and
    providing information on rewards corresponding to the specific object for users included in the specified group of users.

2. The method of claim 1, further comprising: providing information on rewards provided if the mission is completely performed.

3. The method of claim 2, wherein the performable mission includes information on requests for two or more users to acquire digital data corresponding to the specific object simultaneously and at a same place.

4. A non-transitory medium recording a computer readable program to execute the method of claim 1.

5. A server for assisting multiple users to perform a collection simultaneously, comprising:
    a processor coupled to:
    a rewards information managing part for providing mission information to multiple users requesting creation of digital data relating to a specific object during a preset scope of time at a preset location;
    a digital data acquiring part for recognizing an identity of an object within the digital data by matching images of the object with a pre-stored reference object image to compute degrees of similarity and by determining whether those degrees of similarity exceed a prefixed degree of similarity threshold and acquiring from terminals associated with each of multiple users, digital data having information on an image and an auto comment containing a phrase or a sentence properly assembled under grammar of a spoken language, wherein the phrase or sentence includes recognition information on the identity of the objects and recognition information on a place where, and a time when, the image was created;
    condition determining part for determining whether the digital data was created within the prefixed scope of the time by referring to information acquired by time recognition modules of each terminal and whether the recognized object corresponds to the specific object by referring to information acquired if requests for the multiple users to register the digital data are received from their respective terminals;
    a user selecting part for selecting a specified group of users that acquired the digital data within the preset scope of time, wherein the digital data acquired by the specified group of users indicates that the object associated with the acquired digital data corresponds to the specific object;
    wherein the rewards information managing part further provides information on rewards corresponding to the specific object for users included in the specified group of users.

6. The server of claim 5, wherein the reward information on rewards provided if the performable mission is completely performed.

7. The server of claim 6, wherein the performable mission information includes information on requests for two or more users to acquire digital data corresponding to the specific object simultaneously and at the same place.

* * * * *